US009894242B2

United States Patent
Lehavi et al.

(10) Patent No.: US 9,894,242 B2
(45) Date of Patent: *Feb. 13, 2018

(54) PROCESSING A FAX TRANSMISSION USING A MOBILE DEVICE

(71) Applicant: Advanced Messaging Technologies, Inc., Los Angeles, CA (US)

(72) Inventors: Yehoshua Lehavi, Woodland Hills, CA (US); Kirk Freeman, Goleta, CA (US); Luis Garcia Meza, San Diego, CA (US)

(73) Assignee: ADVANCED MESSAGING TECHNOLOGIES, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,332

(22) Filed: Mar. 24, 2017

(65) Prior Publication Data

US 2017/0201645 A1 Jul. 13, 2017

Related U.S. Application Data

(63) Continuation of application No. 14/816,669, filed on Aug. 3, 2015.

(51) Int. Cl.
*H04N 1/327* (2006.01)
*H04W 4/12* (2009.01)
(Continued)

(52) U.S. Cl.
CPC ..... *H04N 1/32708* (2013.01); *H04N 1/00206* (2013.01); *H04N 1/00307* (2013.01);
(Continued)

(58) Field of Classification Search
USPC ........................................................ 358/1.15
See application file for complete search history.

(56) References Cited

U.S. PATENT DOCUMENTS 6,020,980 A 2/2000 Freeman
7,684,383 B1 3/2010 Thompson et al.
(Continued)

FOREIGN PATENT DOCUMENTS

JP 2001127906 5/2001
JP 2009141974 6/2009
(Continued)

OTHER PUBLICATIONS

Non-Final Office Action (dated Apr. 4, 2016), U.S. Appl. No. 14/816,669, filed Aug. 3, 2015, First Named Inventor: Yehoshua Lehavi, 11.
(Continued)

*Primary Examiner* — Ngon Nguyen
(74) *Attorney, Agent, or Firm* — Womble Bond Dickinson (US) LLP

(57) ABSTRACT

Methods and apparatus are described for receiving a fax transmission at a mobile phone. In one embodiment, the mobile phone receives an incoming call and answers the incoming call, upon receiving a command from a user of the mobile phone to answer the incoming call. A program on the mobile phone then detects that the incoming call is a fax transmission, and then places an outgoing call to a fax server. The program on the mobile phone then conferences the incoming call with the outgoing call to the fax server, such that the fax server receives the fax transmission. Other embodiments are also described and claimed.

17 Claims, 9 Drawing Sheets

(51) Int. Cl.
*H04N 1/00* (2006.01)
*H04N 1/32* (2006.01)

(52) U.S. Cl.
CPC ..... *H04N 1/32406* (2013.01); *H04N 1/32719* (2013.01); *H04W 4/12* (2013.01)

(56) References Cited

U.S. PATENT DOCUMENTS

| | | | |
|---|---|---|---|
| 7,990,950 | B2 | 8/2011 | Zucker |
| 8,400,664 | B2 | 3/2013 | Trandal et al. |
| 8,838,704 | B2 | 9/2014 | Naylor et al. |
| 8,868,131 | B2 | 10/2014 | Bard et al. |
| 2010/0002260 | A1* | 1/2010 | Naylor ............... H04N 1/00209 358/1.15 |
| 2010/0128291 | A1 | 5/2010 | Vendrow et al. |
| 2013/0188228 | A1 | 7/2013 | Poon |
| 2013/0242353 | A1* | 9/2013 | Bard ................... H04N 1/00307 358/442 |
| 2014/0177001 | A1 | 6/2014 | Meyers et al. |
| 2014/0192968 | A1 | 7/2014 | Stroud et al. |

FOREIGN PATENT DOCUMENTS

| | | |
|---|---|---|
| JP | 2010251884 | 11/2010 |
| WO | WO-0105131 | 1/2001 |

OTHER PUBLICATIONS

Japanese Office Action with English Language Translation, dated Aug. 30, 2016, Japanese Application No. 2015-241961.
International Search Report and Written Opinion, dated Jul. 26, 2016, Application No. PCT/US2016/032552.
U.S. Final Office Action, dated Aug. 11, 2016, U.S. Appl. No. 14/816,669.
"Fax and Modem Tones Basics (VoIP)", Fax Server Software, Internet document at: http://what-when-how.com/voip/fax-and-modem-tones-basics-voip/, Admitted Prior Art, 4 pages.
"Fax Over IP", Linkedin Discussions, Mar. 29, 2012, Internet Document at: https://www.linkedin.com/groups/Is-it-possible-receive-Fax-1775302.S.104316746, 2 pages.
"Voice Service Features", Lugosoft, Copyright LuGoSoft.com 2000-2011, Goldschmidt Enterprises, Inc., WA, USA, Internet Document at: http://www.lugosoft.com/help/voip/features, 2 pages.
Crowded Road, "iFax—Send & Receive Faxes", iTunes Preview, Feb. 19, 2015, Version 4.99.32, Internet document at: https://itunes.apple.com/us/app/ifax-send-receive-faxes/id331514589?mt=8, 3 pages.
J2 Global, Inc., "eFax—Mobile Phone Fax App", iTunes Preview, Feb. 3, 2015, Version 4.1.1, Internet document at: https://itunes.apple.com/us/app/efax-mobile-phone-fax-app/id399922064 . . . , 3 pages.

\* cited by examiner

PROCESSING A FAX TRANSMISSION USING A MOBILE DEVICE

This application is a continuation of U.S. application Ser. No. 14/816,669, filed Aug. 3, 2015.

FIELD

An embodiment of the invention is related to fax messaging, and more specifically to processing a fax transmission sent to a telephone number of a mobile phone. Other embodiments are also described.

BACKGROUND

Fax messaging continues to be an important avenue for the delivery of secure messages between individuals worldwide despite the proliferation of message delivery services that use the Internet. Traditional fax messaging services require both a dedicated fax machine and a dedicated fax number to receive a fax transmission. Modern fax messaging services, such as those provided by j2 Cloud Services, Inc. of Hollywood, Calif., have eliminated the requirement for a dedicated fax machine, utilizing the Internet to provide greater flexibility for subscribers to transmit and receive fax messages. A subscriber of a modern fax messaging service is assigned a direct inward dialing (DID) telephone number, which the subscriber distributes to others who wish to send a fax message to the subscriber. The DID telephone number is in effect the subscriber's individual fax number. When an incoming fax transmission is received at a particular DID telephone number, the fax messaging service generates a fax message from the fax transmission in a format that is suitable for transmission over a data network such as the Internet, and sends the fax message to the subscriber (e.g., to the subscriber's email address).

As mentioned above, fax messaging services typically assign a separate DID telephone number to each subscriber. The DID telephone number is a unique telephone number that is different from the subscriber's other phone numbers (e.g., mobile phone number, home phone number, work phone number), and thus requires the subscriber to remember yet another telephone number, and to distribute this telephone number to others in order to receive fax messages.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever aspects of the embodiments described here are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

References in the specification to "one embodiment" or "an embodiment" means that a particular feature, structure, or characteristic described in conjunction with the embodiment can be included in at least one embodiment, but every embodiment may not necessarily include the particular feature, structure, or characteristic. Moreover, such phrases are not necessarily referring to the same embodiment.

Embodiments allow for subscribers of a fax messaging service to receive fax transmissions at their mobile phone telephone number, and thus reducing or obviating the need for a separate dedicated direct inward dialing (DID) telephone number. This reduces the administrative burden on the provider of the fax messaging service since the provider does not need to assign and maintain DID telephone numbers for each subscriber. Moreover, subscribers do not need to remember their DID telephone numbers and inform others of their DID telephone numbers in order to receive fax messages. Instead, subscribers only need to remember their mobile phone telephone numbers (which most people already do) and inform others to send fax messages to their mobile phone telephone numbers. Accordingly, fax senders only need to remember the mobile phone number of a recipient to send a fax message to the recipient.

Figure 1:
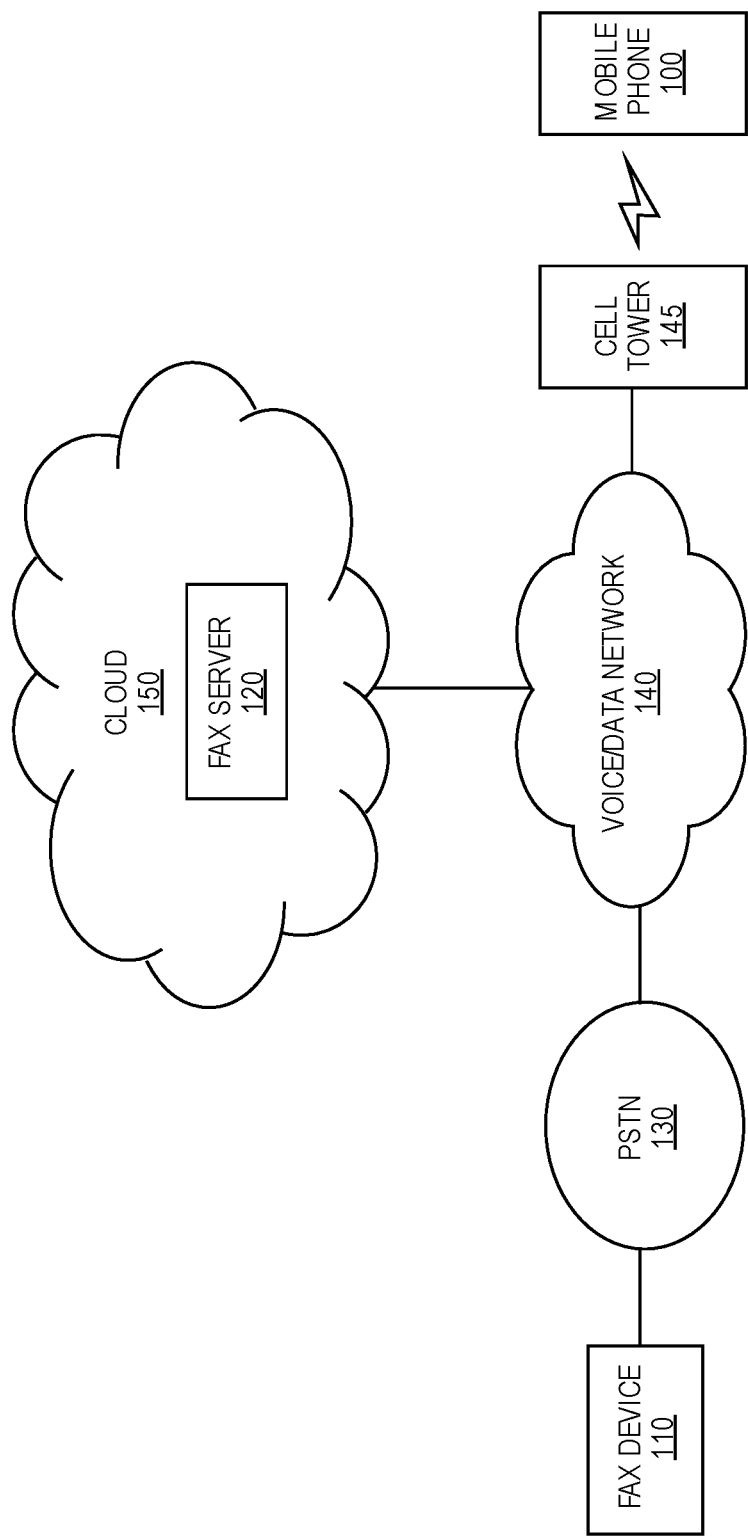
FIG. 1 is a block diagram illustrating a fax messaging system, according to some embodiments.

FIG. 1 is a block diagram illustrating a fax messaging system, according to some embodiments. The fax messaging system includes a public switched telephone network (PSTN) 130 coupled to a voice/data network 140. As shown, a fax device 110 of a sending party is coupled to the PSTN 130 and a mobile phone 100 of a receiving party is coupled to the voice/data network 140 via a cell tower 145. The voice/data network 140 and the cell tower 145 can be part of a communications network that supports voice calls for mobile phones (e.g., a 4G Long Term Evolution (LTE)

network). A fax server 120 located in a cloud computing system 150 is coupled to the voice/data network 140.

The fax device 110 may be a stand-alone dedicated fax transmission and reception device (e.g., a fax machine), or it may be integrated as part of a general purpose computer or server having a fax modem. The fax device 110 can send a fax transmission through the PSTN 130 using a suitable fax protocol such as the Group 3 protocol defined by the International Telecommunications Union Telecommunication Standardization Sector (ITU-T) (e.g., as defined in ITU-T Recommendations T.30 and T.4). The sending party may operate the fax device 110 to thus send a fax transmission to a recipient, by for example placing a paper document into the fax device 110 and entering the phone number of the recipient into the fax device 110. The fax device 110 scans the paper document and converts the contents of the document into an electronic fax format. Alternatively, the fax device 110 may convert an electronic document into the electronic fax format. The fax device 110 then transmits the contents of the document to a destination that is identified by the phone number of the recipient, through the PSTN 130 and/or other communications networks (e.g., using voice-over-IP or fax-over-IP over a data network) in the form of audio-frequency tones (e.g., a fax tone as per the Group 3 protocol).

The mobile phone 100 can be any mobile device that is capable of receiving phone calls originating from the PSTN 130, voice/data network 140, or similar communications networks. For example, the mobile phone 100 may receive an incoming call originated by the fax device 110 through the PSTN 130, voice/data network 140, other communications networks, or any combination thereof (e.g., if the sending party sends a fax transmission to the telephone number of the mobile phone 100). However, mobile phones in general are not configured to process or handle incoming fax transmissions (as an incoming phone call). For example, if the receiving party (e.g., user) answers an incoming call from the fax device 110 using the mobile phone 100, the receiving party will hear a fax tone that is incomprehensible to a human, and there is no way for the receiving party to receive the message content from the fax transmission or otherwise decode or decipher the contents of the fax transmission. In one embodiment, as will be described further herein below, the mobile phone 100 can place an outgoing call to the fax server 120 and conference (or merge) the incoming call with the outgoing call such that the fax server 120 can receive the incoming call and decode the fax transmission contained therein.

The fax server 120 is operated by a fax messaging service and is capable of processing fax transmissions destined for subscribers of the fax messaging service. The fax server 120 can receive a fax transmission intended for a subscriber, generate a fax message from (or decode message content in) the fax transmission, wherein the fax message is in a format that is viewable by the subscriber, e.g. Portable Document Format (PDF), Tagged Image File Format (TIFF), and make the fax message available to the subscriber. In one embodiment, the fax server 120 stores or otherwise has access to a database that stores account information for subscribers of the fax messaging service. The account information for a subscriber (e.g., a user) may include the mobile phone telephone number of the subscriber, the e-mail address of the subscriber, and other information related to the subscriber's account. As shown, the fax server 120 is part of a cloud computing system 150. In other embodiments, the fax server 120 may be implemented by a stand-alone server computer or a cluster of server computers.

Typically, fax messaging services assign a different DID telephone number to each subscriber. A subscriber distributes his or her DID telephone number to others who wish to send a fax message to the subscriber. The DID telephone number is in effect the subscriber's individual fax number. When a sending party sends a fax transmission to the subscriber's DID telephone number, the fax messaging service generates a fax message from the fax transmission, and makes the fax message available to the subscriber (e.g., a download over the Internet, via a website or via a mobile app). However, as discussed above, assigning and maintaining a separate DID telephone number for each subscriber may be an administrative burden for the provider of the fax messaging service. Also, assigning a DID telephone number to a subscriber requires the subscriber to remember his or her DID telephone number, and distribute this additional number to others in order to receive fax messages. Also, the sending party needs to remember the DID telephone number of the subscriber in order to send a fax message to the subscriber.

Embodiments overcome these disadvantages by allowing fax messages to be sent directly as fax transmissions to the receiving party's mobile phone telephone number, thus reducing or obviating the need for a separate DID telephone number. To this end, a software program for handling fax transmissions (i.e., a fax software program) may be installed on the mobile phone 100 for handling incoming fax transmissions. In one embodiment, the fax software program is integrated as part of an operating system of the mobile phone 100. In another embodiment, the fax software program is an application (e.g., a mobile app) that runs on top of an operating system of the mobile phone 100. The fax software program can be executed as a background process of the mobile phone 100 and can be activated (e.g., brought to the foreground) as needed.

In one embodiment, the fax software program is launched but then remains in the background, and is activated (e.g., brought to the foreground) when the receiving party receives or answers an incoming call on his or her mobile phone 100. When the receiving party answers the incoming call, the fax software program detects whether the incoming call is a fax transmission. In one embodiment, the fax software program has previous knowledge of fax tones, and hence detects whether the incoming call is a fax transmission by applying digital audio signal processing upon the incoming or so-called downlink communications audio signal or stream, to find out whether a fax tone is present in the incoming call. An example is a 1100 Hz calling tone from the sender or originator fax device 110. In some cases, the fax software program may not have direct access to the downlink audio stream (e.g., if the underlying operating system does not allow it). In this case, the fax software program may capture the downlink audio stream by creating a feedback mechanism between a speaker and a microphone of the mobile phone 100 where the microphone captures the sound output by the speaker as the speaker is being driven by the downlink audio stream.

If the fax software program determines that the incoming call is a fax transmission, the fax software program in response places an outgoing call to the fax server 120 (using a multi-call feature in the mobile phone 100). The fax software program may have previously stored a telephone number of the fax server 120 (e.g., when the fax software program was downloaded/installed), which it accesses from local memory in the mobile phone 100, when placing an outgoing call to the fax server 120. This telephone number may be a shared number in that it would be used by the fax server programs running in the mobile phones 100 of a number of subscribers to the messaging service (for calling the fax server 120). Once the fax server 120 answers the outgoing call, the fax software program can then conference, or merge, the incoming call with the outgoing call to the fax server 120 such that the fax server 120 also receives the on-going fax transmission. For example, in one embodiment, the fax software program establishes a three-way call between the fax device 110, the mobile phone 100, and the fax server 120 so that the fax server 120 can receive the fax transmission originated by the fax device 110.

The fax server 120 receives the fax transmission originated by the fax device 110 and in response generates a fax message from the fax transmission in a format that is viewable by the receiving party, and makes the fax message available to the receiving party. In one embodiment, the fax server 120 performs in error correction mode (ECM) to detect and correct errors that may have occurred in the fax transmission (e.g., caused by noise). In one embodiment, the fax server 120 can identify the receiving party (e.g., as being a subscriber to a fax messaging service) based on the mobile phone telephone number that was used to call the fax server 120 (e.g., as detected through a caller ID mechanism, when receiving the outgoing call from the mobile phone 100). The fax server 120 may have stored the mobile phone telephone number of the receiving party (e.g., when the receiving party subscribed to the fax messaging service), and may use this information to identify the receiving party.

The fax server 120 can make the fax message available to the receiving party through various means. In one embodiment, the fax server 120 sends the fax message to an e-mail address of the receiving party—a so-called "push" mechanism. In another embodiment, the fax server 120 stores the fax message in a data storage until it is accessed there by the receiving party over a network—a so-called "pull" mechanism. For example, the fax message may remain stored on a web server accessible over the Internet. In another embodiment, a notification is sent to (addressed to) the receiving party that indicates that a new fax message is available, along with information on how to access the new fax message (e.g., an email notification containing a link, such as a uniform resource locator (URL), to the stored fax message). In one embodiment, the notification is sent as a text message to the known telephone number of the mobile phone 100. The receiving party may specify to the provider of the fax messaging service when and how the receiving party wishes to receive fax messages and/or notifications. For example, the receiving party may specify to the provider that any new fax messages for the receiving party should be sent as an attachment in an e-mail to the e-mail address of the receiving party. Suitable web servers or mail servers may be provided as part of the fax messaging system to implement such functionality.

Figure 2:
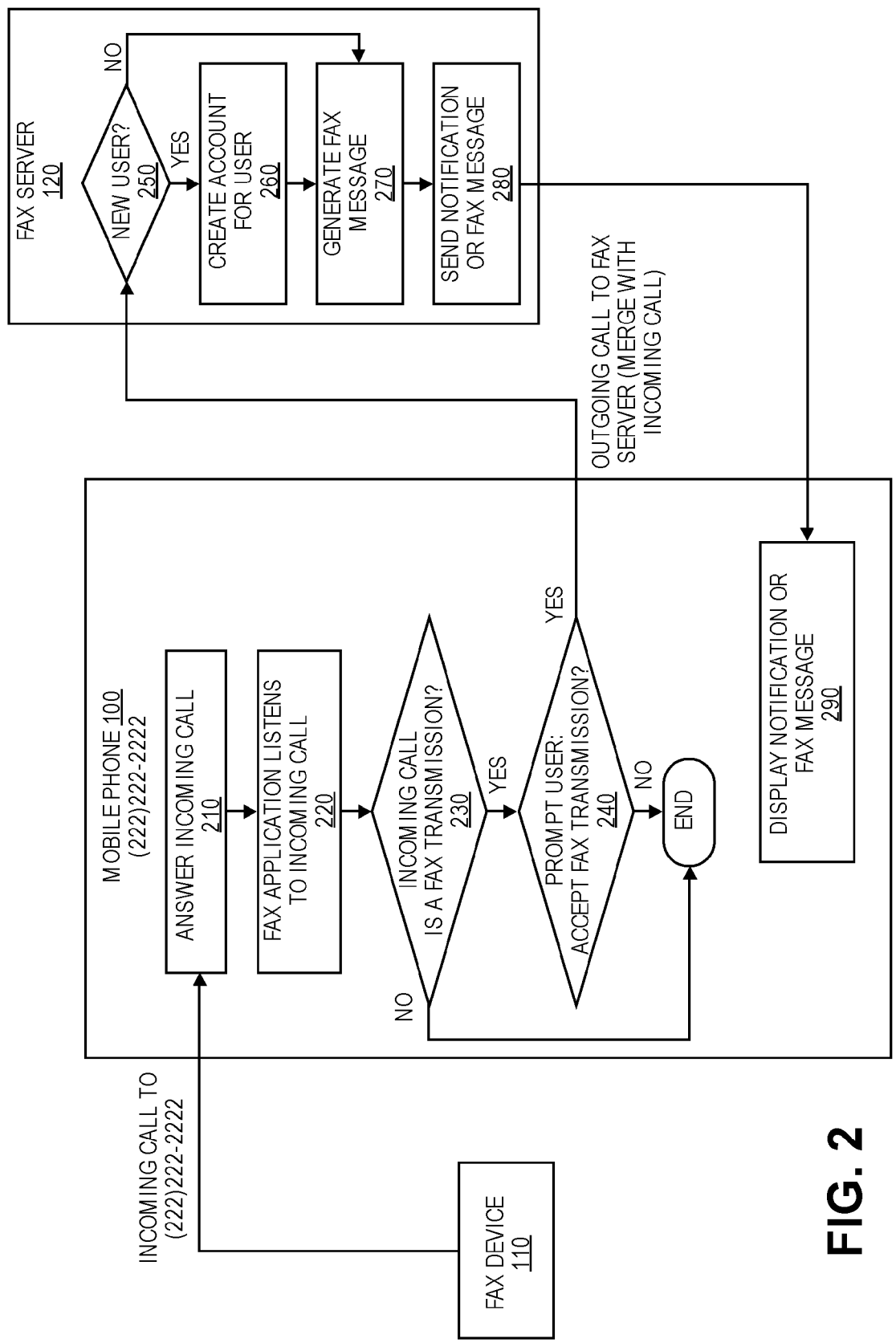
FIG. 2 is a flow diagram illustrating operations performed by a fax device, a mobile phone, and a fax server that allow a mobile phone to receive a fax message sent directly as a fax transmission to a telephone number of the mobile phone, according to some embodiments.

FIG. 2 is a flow diagram illustrating operations performed by a fax device, a mobile phone, and a fax server that allow a mobile phone to receive a fax message sent directly as a fax transmission to a telephone number of the mobile phone, according to some embodiments.

Figure 7A:
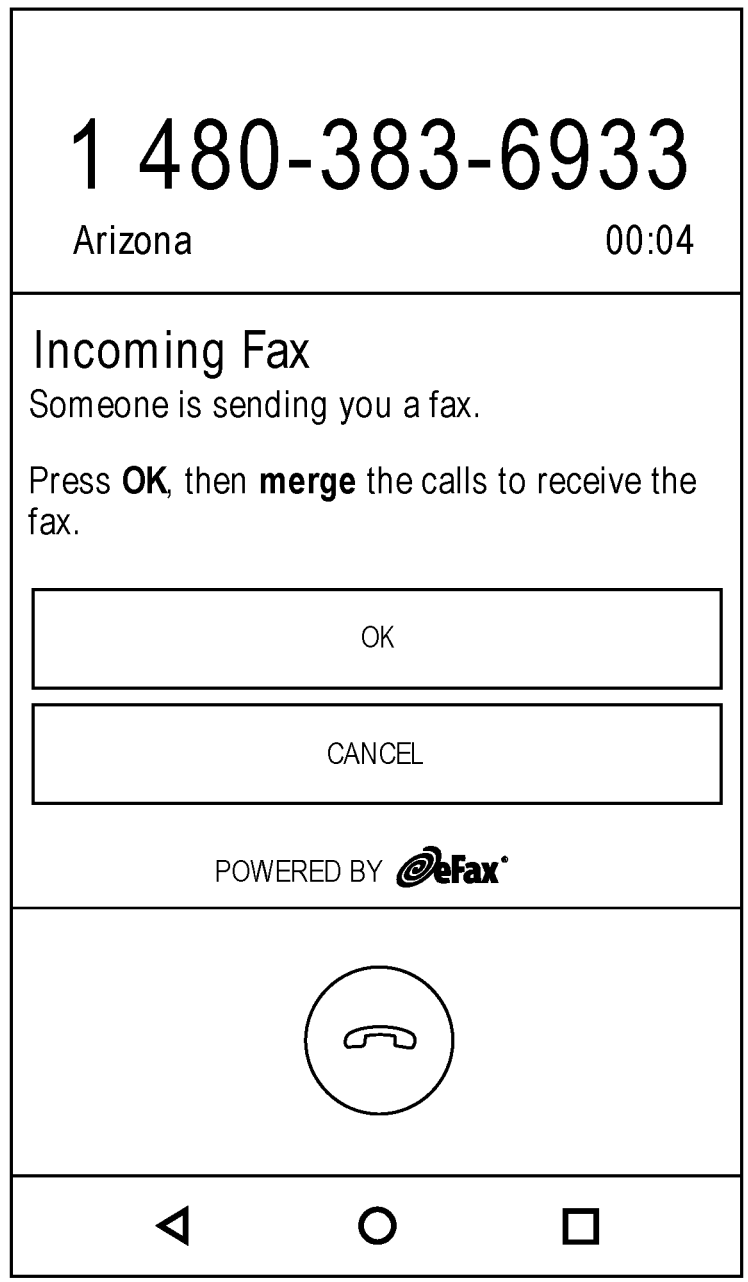
FIG. 7A shows an exemplary user interface displayed on a display of a mobile phone when a fax software program determines that an incoming call is a fax transmission, according to some embodiments.

The fax device 110 places a call to a telephone number of the mobile phone 100 (i.e., telephone number (222) 222-2222) and the mobile phone 100 receives the incoming call. At this point, the user of the mobile phone 100 (receiving party) does not know that the incoming call is a fax transmission from a fax device 110, as the incoming call is received in the same way a voice call would be received. The user of the mobile phone 100 then answers the incoming call (block 210), for example, by actuating a physical button of the mobile phone 100 or actuating a virtual button displayed on a touch screen display of the mobile phone 100. A software program for handling fax transmissions (i.e., a fax software program) that has been previously installed on the mobile phone 100 is first launched, or is activated (e.g., brought to the foreground), in response to the user answering the incoming call. The fax software program listens to the incoming call (block 220) to determine whether the incoming call is a fax transmission (decision block 230). If the fax software program determines that the incoming call is not a fax transmission (e.g., it is a voice call), then the process ends and the fax software program is closed or otherwise deactivated (e.g., sent to the background). If the fax software program determines that the incoming call is a fax transmission, then it displays a prompt to the user on the display of the mobile phone 100 (decision block 240). FIG. 7A shows an exemplary user interface displayed on the touch screen display of the mobile phone 100 when the fax software program determines that the incoming call is a fax transmission, according to some embodiments. In one embodiment, the prompt notifies the user (receiving party) that the incoming call (having the detected caller ID 1-480-383-6933 being an Arizona phone number) is or contains a fax transmission (e.g., "Incoming Fax: Someone is sending you a fax") and asks the user whether the user wishes to accept the fax transmission (e.g., "Press OK to accept the fax"). Thus, the user is being provided with an option to conference the incoming call with the fax server. If the user responds to the prompt with an indication that the user wishes not to accept the fax transmission (e.g., by pressing the "cancel" button), then the process ends and the fax software program is closed or otherwise deactivated. If the user responds to the prompt with an indication that the user wishes to accept the fax transmission (e.g., by pressing the "ok" button), then the fax software program causes the mobile phone 100 to place an outgoing call to the fax server 120 (while the incoming call and the fax transmission therein continues to progress).

In an embodiment where the voice/data network employs a Long Term Evolution (LTE) wireless telecom protocol, the mobile phone 100 may place the outgoing call, for example, by transmitting a non-access stratum (NAS) service request to the core network (e.g., via a radio access network). As mentioned above, in one embodiment, the fax software program may have previously stored a telephone number of the fax server 120 (e.g., when the fax software program was downloaded/installed), which it accesses from local memory in the mobile phone 100, when placing an outgoing call to the fax server 120. In another embodiment, the fax software program may have previously stored multiple telephone numbers that can be used to call a fax server 120 operated by a fax messaging service, and the mobile phone 100 may select one of these telephone numbers to place an outgoing call to the fax server 120. In one embodiment, the fax software program selects the telephone number based on the current location of the mobile phone 100. For example, the fax software program may select a telephone number that is local to the current location of the mobile phone 100 so as to avoid incurring long distance charges. In yet another embodiment, the fax software program may obtain the telephone number of the fax server 120 by accessing a server that stores the telephone number of the fax server 120 (e.g., over the Internet).

Figure 7B:
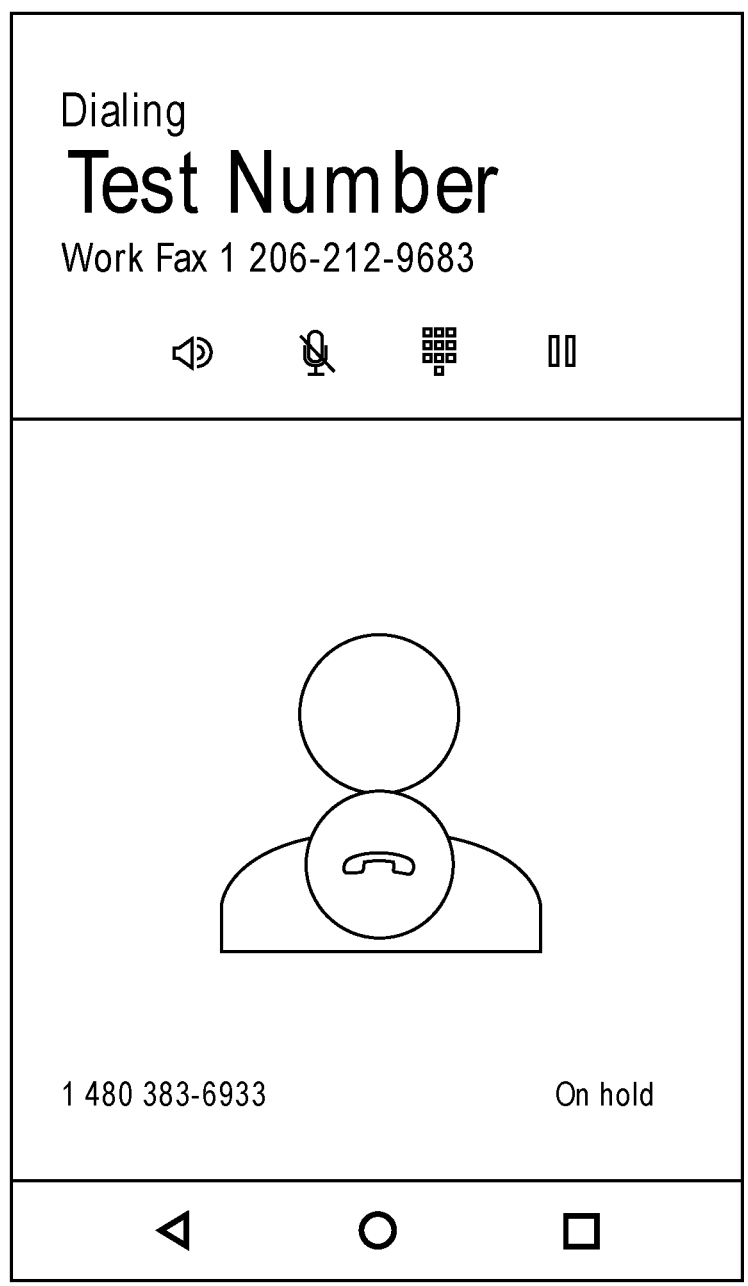
FIG. 7B shows an exemplary user interface displayed on a display of a mobile phone when a fax software program causes the mobile phone to place an outgoing call to a fax server, according to some embodiments.

FIG. 7B shows an exemplary user interface displayed on the display of the mobile phone 100 when the fax software program causes the mobile phone 100 to place an outgoing call to the fax server 120, according to some embodiments.

As shown, the user interface may indicate that the incoming call is placed on hold while the mobile phone 100 places the outgoing call to the fax server 120, in this example by dialing the phone number 1-206-212-9683. When the outgoing call is answered, the fax software program then conferences or otherwise merges the incoming call with the outgoing call to the fax server 120, so that the fax server 120 can receive the fax transmission. Since the fax server 120 is now a participant in the conferenced call or merged call, the fax server 120 can listen to the fax transmission being sent by the fax device 110 (as well as respond to the fax device 110 with fax tones), and will generate a fax message from the fax transmission.

Figure 7C:
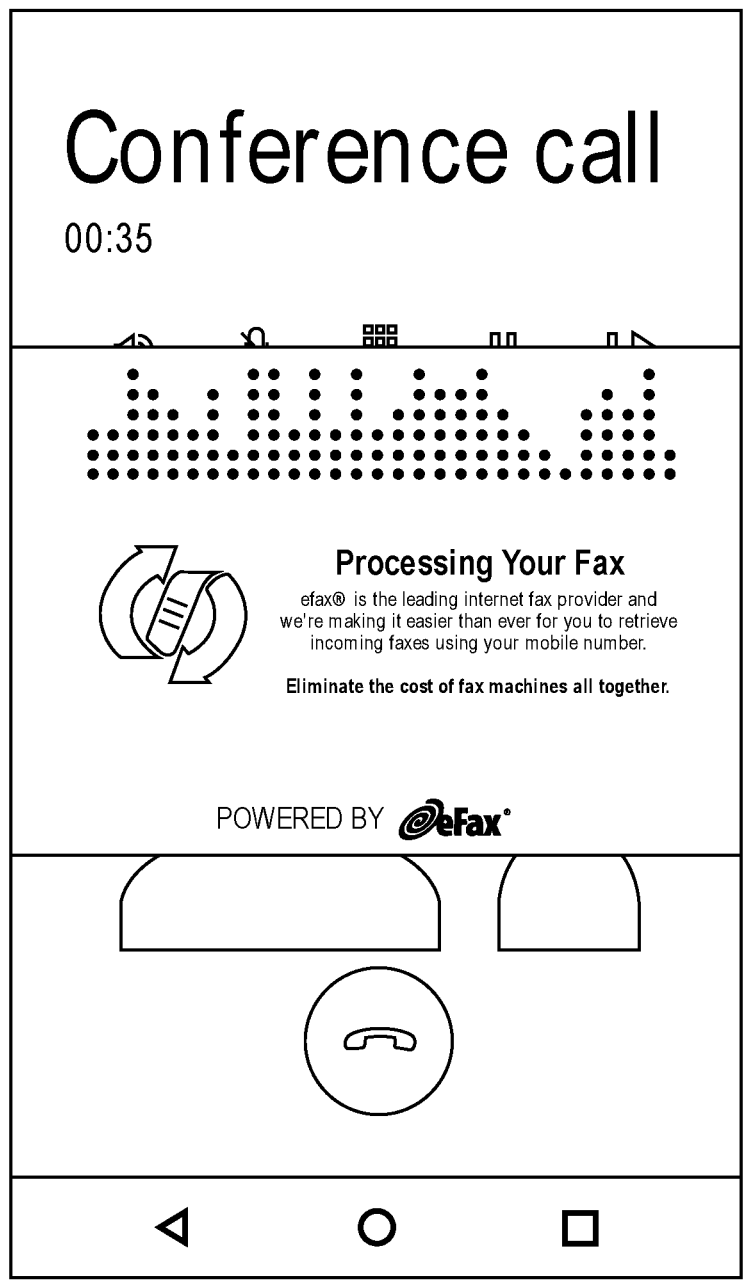
FIG. 7C shows an exemplary user interface displayed on a display of a mobile phone when a fax software program establishes a conference call between the mobile phone, a fax device, and a fax server, according to some embodiments.

FIG. 7C shows an exemplary user interface displayed on the display of the mobile phone 100 when the fax software program establishes a conference call between the mobile phone 100, the fax device 110, and the fax server 120, according to some embodiments. In one embodiment, the fax software program displays an advertisement or other promotional content on the display of the mobile phone 100 while the fax server 120 is in the process of receiving the fax transmission from the fax device 110, in this example an advertisement for EFAX internet fax services. The fax software program may also provide an interface for the user of the mobile phone 100 to minimize or close the advertisement.

In one embodiment, the fax software program on the mobile phone 100 causes the mobile phone 100 to mute its microphone so that background sound (e.g., ambient noise in the environment of the user of the mobile phone 100) is not introduced into the fax transmission during the conferenced/merged call, i.e. while the fax server is receiving the fax transmission.

When the fax software program determines that the fax server 120 has finished receiving the fax transmission from the fax device 110, the fax software program may cause the mobile phone 100 to end the conference call. In one embodiment, the fax software program may determine that the fax transmission has finished, by listening (to the conferenced/merged call) for a fax tone indicating that the fax server 120 successfully received the fax transmission. The fax software program may also alert the user of the mobile phone 100 that the fax server 120 has successfully received the fax transmission (e.g., through a visual alert on the display of the mobile phone 100, an audible alert, a vibration of the mobile phone 100, or any other suitable notification mechanism).

In one embodiment, upon receiving an incoming call, the fax server 120 checks whether the user of the mobile phone 100 is a new user (i.e., the user is not an existing subscriber to the fax messaging service) (decision block 250). In one embodiment, the fax server 120 determines whether the user of the mobile phone 100 is a new user by checking whether the telephone number of the mobile phone 100 that conferenced the fax server 120 is associated with an existing subscriber (e.g., by matching the known telephone number of the mobile phone 100 against subscriber account information stored in a database). In one embodiment, the fax server 120 can identify the telephone number of the mobile phone 100 that conferenced the fax server 120 using caller-ID techniques. If the user is a new user, then the fax server 120 may create a user account for the user (block 260). Creating a new user account for the user may involve the fax messaging service requesting information from the user (e.g., through the fax software program, through a website, or other means). In one embodiment, the fax server 120 or other server operated by the fax messaging service can automatically obtain information about the user from the fax software program, without actively soliciting the user. For example, the fax software program may have knowledge of the user's e-mail address and may send this information (e.g., over a data network such as the Internet) to the fax server 120 or other server operated by the fax messaging service when the mobile phone 100 places the outgoing call to the fax server 120. The fax server 120 may then associate this e-mail address with the user, when creating a user account for the user, e.g. stores the e-mail address in association with the caller-ID received with the incoming call from the user's mobile hone 100. The fax server 120 may thereafter use this e-mail address to send a fax message (that it receives through an incoming call form the user's mobile phone) to the user. If the user is not a new user (i.e., the user is an existing subscriber to the fax messaging service or has created an account with the fax messaging service), then the fax server 120 generates a fax message from the fax transmission (block 270). In one embodiment, the fax server 120 generates the fax message in a digital format that is viewable on the mobile phone 100 or other type of computing device. For example, the fax server 120 may format the fax message in a portable document format (PDF) format. The fax server 120 then sends a notification to the mobile phone 100 indicating that the fax message is ready to be viewed and/or directly sends the fax message to the mobile phone 100 of the user (block 280). The mobile phone 100 receives the notification and/or the fax message and displays it on the display of the mobile phone 100 (block 290). The fax server 120 can make the fax message available to the user of the mobile phone 100 (i.e., the receiving party) through various means (e.g., through e-mail or by storing the fax message on a web server accessible by the user). In one embodiment, the fax messaging service may request payment from the user of the mobile phone 100 (e.g., through the fax software program) or otherwise process a payment for the user (e.g., by deducting payment credit from the user's account) before making the fax message available to the user. Thus, these operations allow a user to receive a fax message sent directly as a fax transmission to a telephone number of the mobile phone 100.

Figure 3:
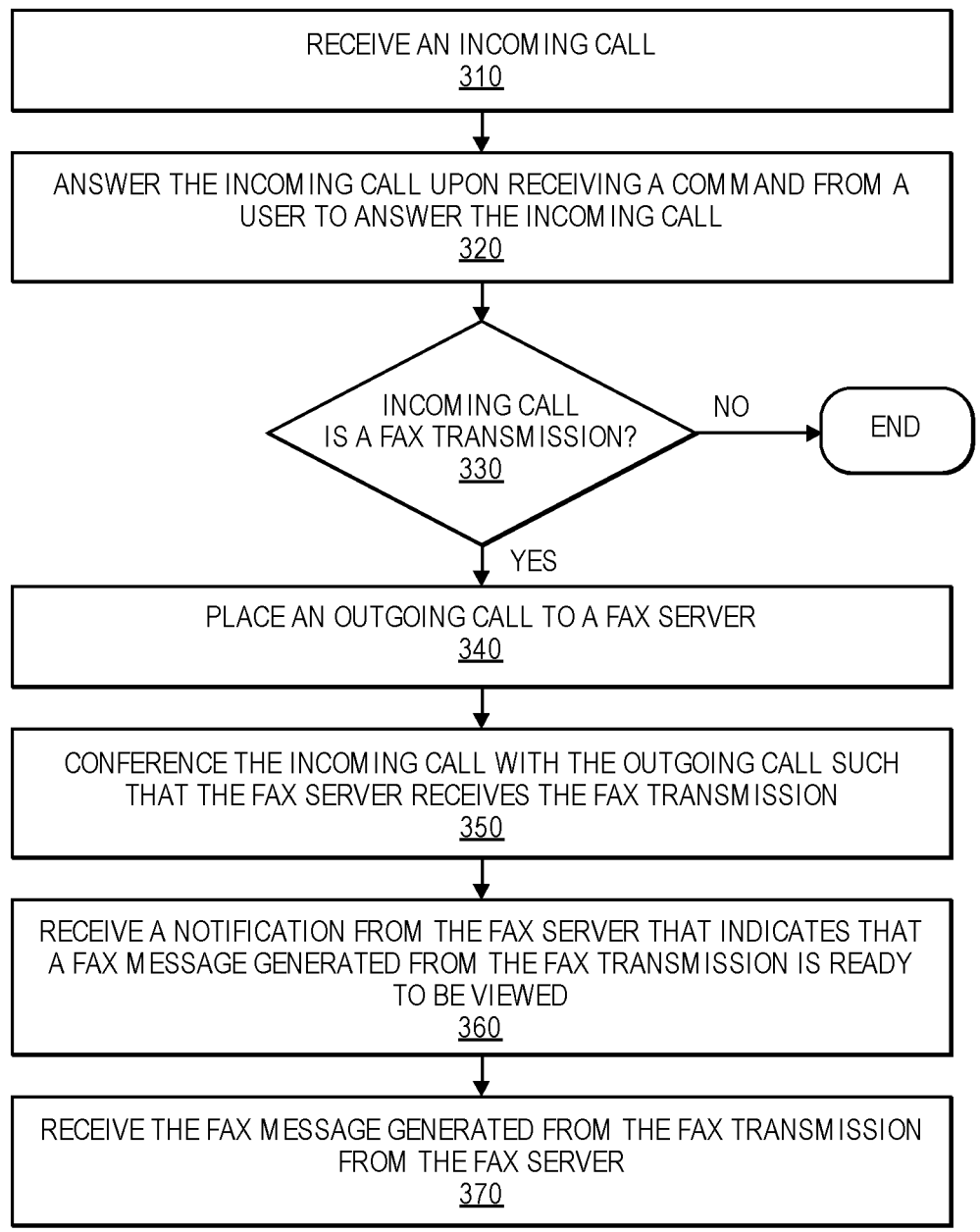
FIG. 3 is a flow diagram illustrating a process for processing a fax transmission sent to a telephone number of a mobile phone, according to some embodiments.

FIG. 3 is a flow diagram illustrating a process for processing a fax transmission sent to a telephone number of a mobile phone, according to some embodiments. The operations of the flow diagram may be performed by a mobile phone 100. In one embodiment, the process is initiated when the mobile phone 100 receives an incoming call (block 310). The mobile phone 100 answers the incoming call upon receiving a command from a user of the mobile phone 100 to answer the incoming call (block 320). In one embodiment, a software program for handling fax transmissions (i.e., a fax software program) is launched or activated (e.g., brought to the foreground) when the mobile phone 100 answers the incoming call. Alternatively, the fax software program may be launched or activated when the incoming call is received (but before the incoming call is answered). Once the call is answered, the fax software program listens to the incoming call and determines whether the incoming call is a fax transmission (decision block 330). If the incoming call is determined not to be a fax transmission, then the process ends. If the incoming call is not a fax transmission, then this means that the incoming call is a voice call. As such, the fax software program may close or otherwise deactivate itself (e.g., send the fax software program to the background) and let the user continue with the voice call. If the incoming call is determined to be a fax transmission, then the fax software program places an outgoing call to a fax server 120 (block 340), while the incoming call continues to progress. When the outgoing call is answered, the fax software program conferences the incoming call with the outgoing call such that the fax server 120 receives the fax transmission (block 350). In one embodiment, after the fax transmission is complete, the mobile phone 100 then receives a notification from the fax server 120 that indicates that a fax message generated from the fax transmission is ready to be viewed (block 360). In one embodiment, the mobile phone 100 receives the fax message from the fax server 120 (block 370) and displays it to the user. Thus, the process allows a mobile phone 100 to receive a fax message sent directly as a fax transmission to the telephone number of the mobile phone 100.

Figure 4:
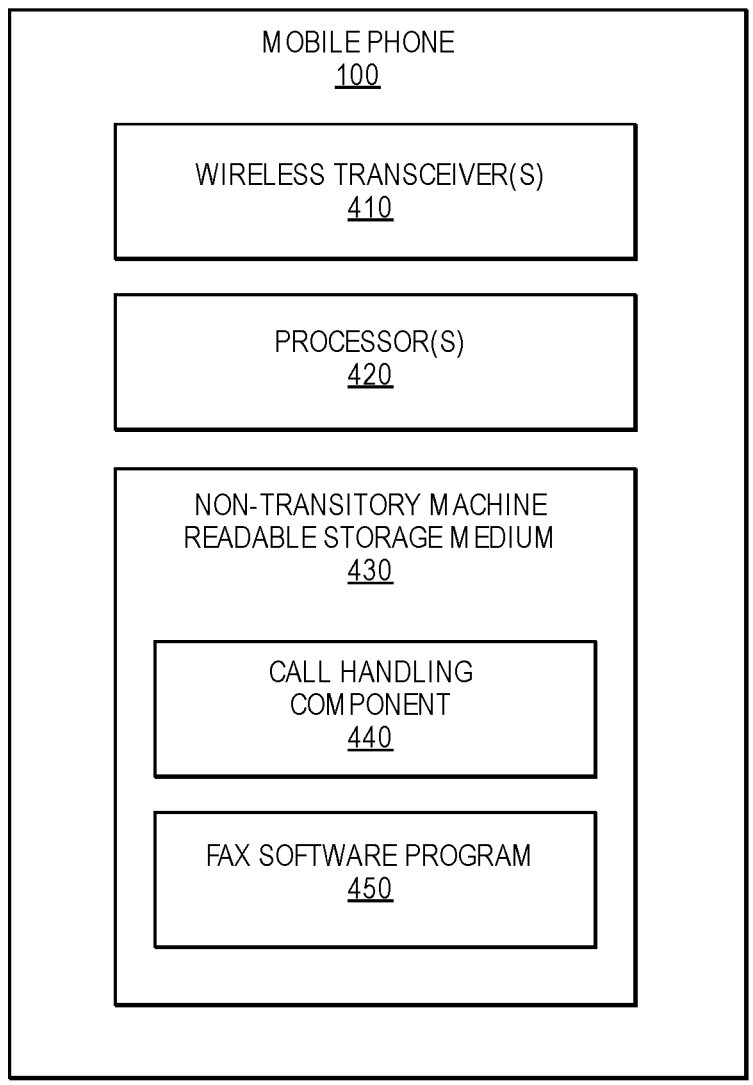
FIG. 4 is a block diagram illustrating a mobile phone, according to some embodiments.

FIG. 4 is a block diagram illustrating a mobile phone, according to some embodiments. The mobile phone 100 includes a wireless transceiver 410, a processor 420, and a non-transitory machine-readable storage medium 430. The non-transitory machine-readable storage medium 430 has stored therein a call handling component 440 and a fax software program 450. Examples of non-transitory machine readable storage mediums include read-only memory, random-access memory, CD-ROMs, DVDs, magnetic tape, optical data storage devices, flash memory devices, and phase change memory.

The wireless transceiver 410 allows the mobile phone 100 to wirelessly communicate with other devices such as a fax device 110 and/or a fax server 120 over a communications network (e.g., over voice/data network 140 via cell tower 145). In one embodiment, the wireless transceiver 410 is a radio transceiver that can exchange radio signals with a cell tower 145.

The processor 420 may include one or more data processing circuits, such as a general purpose and/or special purpose processor (e.g., microprocessor). The processor 420 may execute the call handling component 440 and the fax software program 450 to perform some or all of the mobile phone operations and methods that are described above for one or more of the embodiments related to the mobile phone 100. For example, the processor 420 may execute the call handling component 440 to receive and answer incoming calls, to place outgoing calls (e.g., to a fax server 120), and to conference an incoming call with an outgoing call. The processor 420 may execute the fax software program 450 to detect that an incoming call is a fax transmission, to cause or signal the call handling component to place an outgoing call to a fax server 120, to cause or signal the call handling component to conference an ongoing incoming call with an outgoing call to a fax server 120, and to receive a fax message, generated from the fax transmission, from the fax server. Accordingly, the mobile phone 100 can carry out at least some of the functionality described herein to receive a fax transmission sent directly to a telephone number of the mobile phone 100.

Figure 5:
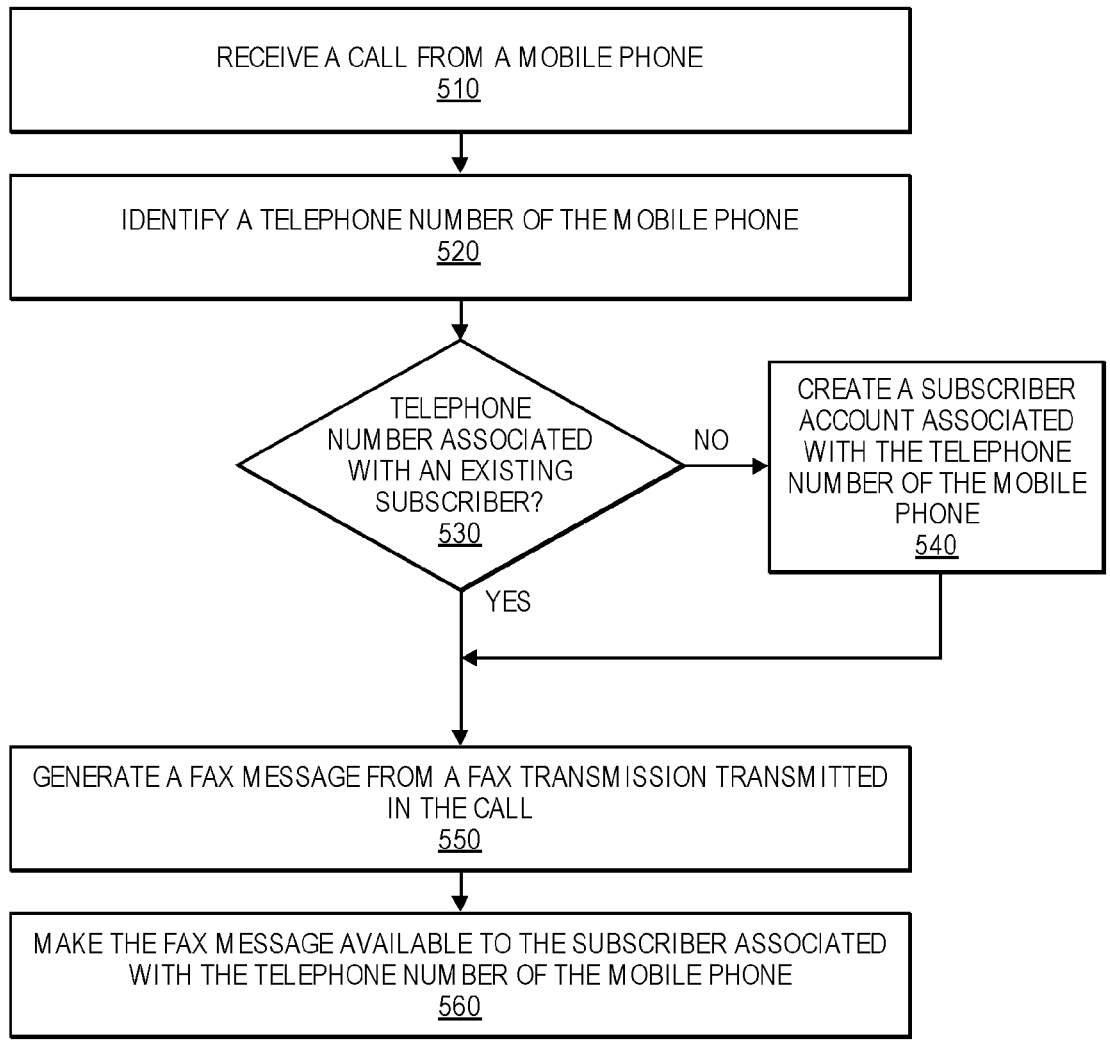
FIG. 5 is a flow diagram illustrating a process for processing a fax transmission, according to some embodiments.

FIG. 5 is a flow diagram illustrating a process for processing a fax transmission, according to some embodiments. The operations of the flow diagram may be performed by a fax server 120. In one embodiment, the process is initiated when the fax server 120 receives a call from a mobile phone (block 510). The call may have been initiated by the mobile phone 100 in response to the mobile phone 100 receiving a fax transmission from a fax device 110 (e.g., as in block 340 in FIG. 3). The fax server 120 identifies a telephone number of the mobile phone (block 520). In one embodiment, the telephone number of the mobile phone is identified using caller-ID techniques. The fax server 120 determines whether the telephone number of the mobile phone is associated with an existing subscriber of the fax messaging service (decision block 530). In one embodiment, the fax server 120 determines whether the telephone number of the mobile phone is associated with an existing subscriber of the fax messaging service by matching the telephone number of the mobile phone 100 against subscriber records stored in a database. If the telephone number of the mobile phone 100 is not associated with an existing subscriber, then the fax server 120 creates a subscriber account associated with the telephone number of the mobile phone 100 (block 540). In one embodiment, the fax server 120 may obtain additional information about the user of the mobile phone 100 (e.g., e-mail address, notification preferences) and associate this information with the subscriber account. This additional information may be obtained, for example, through the fax software program running on the mobile phone 100, a website, or other means.

If the telephone number of the mobile phone 100 is already associated with an existing subscriber or a subscriber account associated with the telephone number of the mobile phone 100 has been created (e.g., as in block 540), then the fax server 120 generates a fax message from a fax transmission in the call (block 550) and makes the fax message available to the subscriber associated with the telephone number of the mobile phone 100 (block 560). The fax server 120 can make the fax message available to the subscriber associated with the telephone number of the mobile phone 100 through various means. For example, in one embodiment, the fax server may send a text message to the known telephone number of the mobile phone 100 that indicates that the fax message is ready for viewing and that also provides information on how to access the fax message. In another embodiment, the fax server 120 may send the fax message as an attachment in an e-mail to an e-mail address associated with the subscriber. In another embodiment, the fax server 120 may store the fax message on a server that is accessible by the subscriber (e.g., through a portal website). In yet another embodiment, the fax server 120 may send the fax message directly to the mobile phone 100 such that the subscriber can view the fax message directly from the fax software program installed on the mobile phone 100. Thus, the process allows a fax server 120 to process a fax transmission received in a call from a mobile phone 100.

Figure 6:
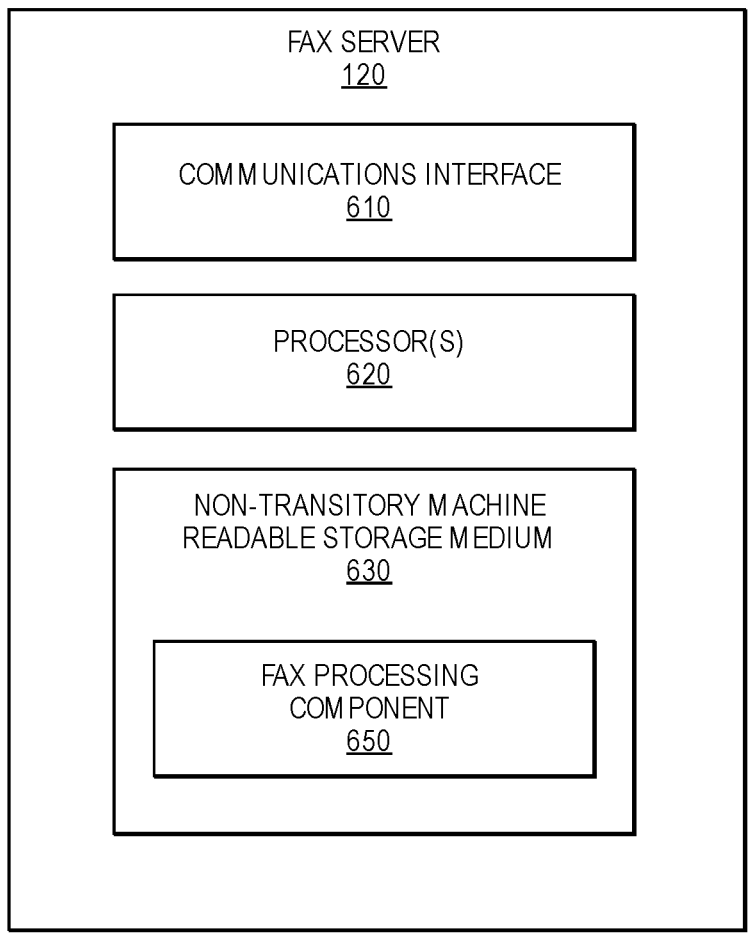
FIG. 6 is a block diagram illustrating a fax server, according to some embodiments.

FIG. 6 is a block diagram illustrating a fax server, according to some embodiments. The fax server 120 includes a communications interface 610, a processor 620, and a non-transitory machine-readable storage medium 630. The non-transitory machine-readable storage medium 630 has stored therein a fax processing component 650. Examples of non-transitory machine readable storage mediums include read-only memory, random-access memory, CD-ROMs, DVDs, magnetic tape, optical data storage devices, flash memory devices, and phase change memory.

The communications interface 610 provides an interface for the fax server 120 to receive a call from a mobile phone 100 over a voice communications network (e.g., a PSTN 130 or voice/data network 140). In one embodiment, the communications interface 610 also provides an interface for the fax server 120 to exchange data with the mobile phone 100 over a data communications network (e.g., the Internet).

The processor 620 may include one or more data processing circuits, such as a general purpose and/or special purpose processor (e.g., microprocessor). The processor 620 may execute the fax processing component 650 to perform some or all of the fax server operations and methods that are described above, for one or more of the embodiments related to the fax server 120. For example, the processor 620 may execute the fax processing component 650 to receive a call from a mobile phone, identify a telephone number of the mobile phone, determine whether the telephone number of the mobile phone is associated with an existing subscriber of the fax messaging service, create a subscriber account associated with the telephone number of the mobile phone, generate a fax message from the fax transmission transmitted by the call, and make the fax message available to the subscriber associated with the telephone number of the mobile phone. Accordingly, the fax server 120 can carry out at least some of the functionality described herein to process a fax transmission received from a call from a mobile phone 100.

The following statements of invention are made. A method performed by a fax server operated by a fax messaging service for processing a fax transmission, comprising: receiving a call from a mobile phone; identifying a telephone number of the mobile phone in connection with the received call; determining whether the telephone number of the mobile phone is associated with an existing subscriber of the fax messaging service; generating a fax message from a fax transmission in the call, in response to determining that the telephone number of the mobile phone is associated with an existing subscriber of the fax messaging service; and making the fax message available to the subscriber associated with the telephone number of the mobile phone. The method further comprising: creating a subscriber account associated with the telephone number of the mobile phone in response to determining that the telephone number of the mobile phone is not associated with an existing subscriber of the fax messaging service.

The following statements of invention are made. An article of manufacture comprising: a non-transitory machine readable medium having stored therein instructions to be executed by a fax server, the instructions when executed by the fax server cause the fax server to receive a call from a mobile phone, identify a telephone number of the mobile phone, determine whether the telephone number of the mobile phone is associated with an existing subscriber of the fax messaging service, generate a fax message from a fax transmission transmitted by the call in response to determining that the telephone number of the mobile phone is associated with an existing subscriber of the fax messaging service, and make the fax message available to the subscriber associated with the telephone number of the mobile phone. The article of manufacture, wherein the instructions when executed by the fax server further cause the fax server to create a subscriber account associated with the telephone number of the mobile phone in response to determining that the telephone number of the mobile phone is not associated with an existing subscriber of the fax messaging service.

The following statements of invention are made. A fax server comprising: a processor; and a non-transitory computer readable storage medium having instructions stored therein, the instructions when executed by the processor cause the fax server to receive a call from a mobile phone, identify a telephone number of the mobile phone, determine whether the telephone number of the mobile phone is associated with an existing subscriber of the fax messaging service, generate a fax message from a fax transmission transmitted by the call in response to determining that the telephone number of the mobile phone is associated with an existing subscriber of the fax messaging service, and make the fax message available to the subscriber associated with the telephone number of the mobile phone. The fax server, wherein the instructions when executed by the processor further cause the fax server to create a subscriber account associated with the telephone number of the mobile phone in response to determining that the telephone number of the mobile phone is not associated with an existing subscriber of the fax messaging service. The fax server, wherein the call from the mobile telephone is received at a telephone number that is shared by a plurality of subscribers, for calling the fax server.

An embodiment may be an article of manufacture in which a non-transitory machine-readable storage medium has stored thereon instructions which program one or more data processing components (generically referred to here as a "processor") to perform the operations described above. Examples include as mentioned above, examples of non-transitory machine readable storage mediums include read-only memory, random-access memory, CD-ROMs, DVDs, magnetic tape, optical data storage devices, flash memory devices, and phase change memory. The non-transitory machine-readable storage medium can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art.

What is claimed is:

1. A method performed by a mobile phone for receiving a fax transmission, comprising:
   receiving an incoming call on the mobile phone;
   answering the incoming call;
   detecting that the incoming call is a fax transmission;
   placing an outgoing call to a fax server; and
   merging the incoming call with the outgoing call to the fax server such that the fax server receives the fax transmission.

2. The method of claim 1, wherein the incoming call was originally initiated by a fax device and addressed to a telephone number of the mobile phone.

3. The method of claim 1, further comprising:
   receiving a notification from the fax server that indicates that a fax message generated from the fax transmission is ready to be viewed.

4. The method of claim 1, further comprising:
   receiving a fax message generated from the fax transmission from the fax server.

5. The method of claim 1, further comprising:
   upon detecting that the incoming call is a fax transmission, displaying a user interface on a display of the mobile phone that provides a user with an option to merge the incoming call with the outgoing call to the fax server.

6. The method of claim 1, further comprising:
   muting a microphone of the mobile phone while the fax server receives the fax transmission.

7. The method of claim 1, further comprising:
   displaying an advertisement on a display of the mobile phone while the fax server receives the fax transmission.

8. The method of claim 1, wherein the merging of the incoming call with the outgoing call comprises:

establishing a three-way call between a fax device that initiated the incoming call, the mobile phone, and the fax server.

9. The method of claim 1, wherein a program on the mobile phone is activated when the incoming call is received.

10. The method of claim 1, wherein a program on the mobile phone is activated when the mobile phone answers the incoming call.

11. The method of claim 1, wherein detecting that the incoming call is a fax transmission comprises:
   determining whether a fax tone is present in the incoming call.

12. A non-transitory machine-readable medium having stored therein instructions of a fax software program to be executed by a mobile phone, the instructions when executed by the mobile phone cause the mobile phone to:
   detect, after an incoming call to the mobile phone is answered, that the incoming call is a fax transmission or is not a fax transmission;
   if the incoming call is a fax transmission, place an outgoing call to a fax server and merge the incoming call with the outgoing call to the fax server such that the fax server receives the fax transmission; and
   if the incoming call is not a fax transmission, then the fax software program does not place an outgoing call to a fax server.

13. The non-transitory machine readable medium of claim 12, wherein the instructions when executed by the mobile phone further cause the mobile phone to:
   receive a notification from the fax server that indicates that a fax message generated from the fax transmission is ready to be viewed.

14. The non-transitory machine readable medium of claim 12, wherein the instructions when executed by the mobile phone further cause the mobile phone to:
   receive a fax message generated from the fax transmission from the fax server.

15. The non-transitory machine readable medium of claim 12, wherein the instructions when executed by the mobile phone further cause the mobile phone to:
   upon detecting that the incoming call is a fax transmission, display a user interface on a display of the mobile phone that provides the user with an option to merge the incoming call with the fax server.

16. The non-transitory machine readable medium of claim 12, wherein the instructions when executed by the mobile phone further cause the mobile phone to:
   mute a microphone of the mobile phone while the fax server receives the fax transmission.

17. The non-transitory machine readable medium of claim 12, wherein the instructions when executed by the mobile phone cause the mobile phone to:
   determine whether a fax tone is present in the incoming call.

* * * * *